United States Patent [19]
Sandered et al.

[11] 4,447,013
[45] May 8, 1984

[54] METHOD AND ARRANGEMENT ON EXTRACTING, REELING UP, PULLING IN, ETC., OF A HEAVY CABLE OR SIMILAR

[75] Inventors: Bror Sandered, Norsborg; Rune Carlsson, Västra Frölunda; Bengt Andersson, Älvängen, all of Sweden

[73] Assignee: MEAB, Mobile Equipment AB, Mölndal, Sweden

[21] Appl. No.: 333,873

[22] PCT Filed: Apr. 22, 1981

[86] PCT No.: PCT/SE81/00119
§ 371 Date: Dec. 17, 1981
§ 102(e) Date: Dec. 17, 1981

[87] PCT Pub. No.: WO81/03089
PCT Pub. Date: Oct. 29, 1981

[30] Foreign Application Priority Data
Apr. 23, 1980 [SE] Sweden .................. 8003049

[51] Int. Cl.³ .................................. B65H 75/40
[52] U.S. Cl. ........................ 242/54 R; 242/86.5 R; 254/134.3 R
[58] Field of Search .............. 242/54 R, 86.5 R, 86.7, 242/86.8, 86.2; 254/134.3 R, 134.3 FT, 385, 386

[56] References Cited
U.S. PATENT DOCUMENTS

| 1,939,796 | 12/1933 | Spowart ............... | 254/134.3 FT |
| 2,181,392 | 11/1939 | Chatham .............. | 24/115 |
| 2,629,768 | 2/1953 | Beil ..................... | 254/134.3 R |
| 3,070,324 | 12/1962 | Bryman ................ | 242/86.5 R |
| 3,240,413 | 3/1966 | Young et al. ......... | 242/54 R X |
| 3,244,292 | 4/1966 | Elliott .................. | 254/134.3 FT X |
| 4,003,456 | 1/1977 | Cullen et al. ......... | 191/12.4 |
| 4,228,990 | 10/1980 | Horvath ............... | 254/134.3 FT |

FOREIGN PATENT DOCUMENTS

| 1025959 | 3/1959 | Fed. Rep. of Germany . |
| 2535759 | 2/1977 | Fed. Rep. of Germany . |
| 1765168 | 6/1978 | Fed. Rep. of Germany . |
| 2115652 | 7/1972 | France . |
| 200881 | 1/1966 | Sweden . |
| 372240 | 12/1974 | Sweden . |
| 391509 | 2/1977 | Sweden . |
| 510343 | 8/1971 | Switzerland . |

Primary Examiner—John M. Jillions
Attorney, Agent, or Firm—Burns, Doane, Swecker & Mathis

[57] ABSTRACT

On extracting, reeling up, pulling in etc., of a heavy cable a main frame that can be set up or that may already be present on a vehicle may be used. The main frame comprises a base unit made up of a number of beams, and two bearing brackets projecting upwards from its long sides. A drum for the cable is supported free to rotate on the bearing brackets. The drum is provided with drive gear which comprises a motor unit and a transmission component. A pulling device is connected to a core of the cable and to a pull-free mechanism secured to the main frame. By means of the pull-free mechanism the cable can be given a small longitudinal displacement which enables the cable to be pulled free of its duct. After pulling free the pulling device is disconnected and the cable is pulled up towards and anchored on the drum, after which the motor unit is operated to turn the drum. The major part of the longitudinal displacement of the cable is then achieved by reeling the cable directly up on to the drum.

11 Claims, 4 Drawing Figures

METHOD AND ARRANGEMENT ON EXTRACTING, REELING UP, PULLING IN, ETC., OF A HEAVY CABLE OR SIMILAR

TECHNICAL FIELD

The present invention relates to a method for extracting, reeling up, pulling in, etc., of a heavy cable or other similar long flexible object, for example a telephone cable or electric power cable, hose etc. In the new method a frame is used which can be set up on a vehicle and which comprises a base unit made up of a number of beams, and two bearing brackets projecting upwards from the long sides of the base unit. A drum for the cable or similar, capable of rotating in the bearing brackets on the frame, and a drive gear for the drum, comprising a motor unit and a transmission component are provided, for example in the form of a drive chain, drive belt or equivalent component. The invention also relates to an arrangement to perform the method.

DESCRIPTION OF THE PRIOR ART

The extraction, reeling-up and pulling-in of cables are basically well-known operations in the relevant context. On extracting a cable in ducts, for example, it has previously been proposed to use a so-called cable stocking, which is applied to the end of the cable down in the cable pit in question. After the stocking has been secured to the end of the cable, the cable is drawn free with the aid of a powered vehicle to which the stocking is connected by means of a draw wire. After a small displacement of the cable, the cable stocking is moved a short distance, and a further small lengthwise displacement is achieved by means of the vehicle. The stocking is then moved further back on the cable, followed by a further small displacement, and so on until the entire cable has been withdrawn from the duct by the said small stepwise displacements of the cable drum and small forward and backward movements of the vehicle used. As the cable is gradually pulled out, it is gradually wound manually onto the relatively large cable drum. In this context it must be realized that the cable in question, which in the case of a telephone cable may be in the form of a lead-sheathed cable with a diameter of 120 mm, for example, is often extremely long.

Other arrangements for the purpose stated above are previously known through U.S. Pat. Nos. 4,003,456, and 4,194,702.

DESCRIPTION OF THE PRESENT INVENTION

TECHNICAL PROBLEMS

Personnel have to work close to the cable and are therefore exposed to the risks of inhaling lead dust. In addition, the known gradual manual reeling-up method is both hazardous and arduous which, in addition to the environmental problems with lead dust already mentioned, lead to unsuitable working positions in which the risk of injury by crushing, back injury and other accident risks are evident.

SOLUTION

The main purpose of the present invention is to create a working method and arrangement for this which solves among other things the range of problems outlined above. What may be regarded as chiefly characterizing the new method is that a pulling device is connected to a core of the cable or similar and to a pull-free mechanism fixed to the frame. The pull-free mechanism is activated for a small lengthwise displacement of the cable or similar and thus for pulling the cable free from a duct, attachment etc. After pulling free the pulling device is disconnected and the core is pulled up towards and anchored to the drum. The motor unit is activated to turn the drum and the subsequent major part of the lengthwise displacement of the cable or similar is achieved by direct winding on to the drum.

Accordingly the new arrangement according to the invention can be chiefly regarded as being characterized in that there is secured to the frame used in the invention a pull-free mechanism to which a core of the cable or similar can be connected via a pulling device. The pull-free mechanism is arranged to transfer a small longitudinal motion to the cable or similar via the pulling device and thus causes the cable to be pulled free in a duct, suspension system, etc. The frame, motor unit and drum are so arranged that after the pulling-free of the cable or similar and the anchoring of the core to the drum, it is possible to wind the cable or similar directly on to the drum during the major part of the lengthwise displacement of the cable or similar.

In further developments of the invention concept, concrete measures are proposed in greater detail to create a highly suitable and convenient method for extracting, reeling up, pulling etc. of a heavy cable. The further developments also relate to more precisely specified designs for among other things the frame used in the invention, which has relatively large dimensions. It may be stated that the total length of the frame is about 5 m, its width about 1.7 m and its overall height about 1.5 m. In addition, the frame is so designed that handing of the cable and reeling the cable on to and off the drum is remarkably simple.

ADVANTAGES

The new method and arrangement has the major advantage that the cable can be handled outside the pit instead of in the pit as previously. Manual handling of the drum is eliminated, with the consequence that the above-mentioned accident risks and environmental problems disappear. In addition, a full view is available of all operations connected with the work in question. Large amounts of time can be saved with the new method and the arrangements for it, and by way of example it can be mentioned that an increase in the rate of at least 10 times has been noted in tests carried out while developing the subject of the invention.

DESCRIPTION OF THE DRAWINGS

A preferred embodiment of a method and an arrangement according to the invention will be described below with simultaneous reference to the attached drawings, in which.

DESCRIPTION OF THE PREFERRED EMBODIMENT

Figure 1:
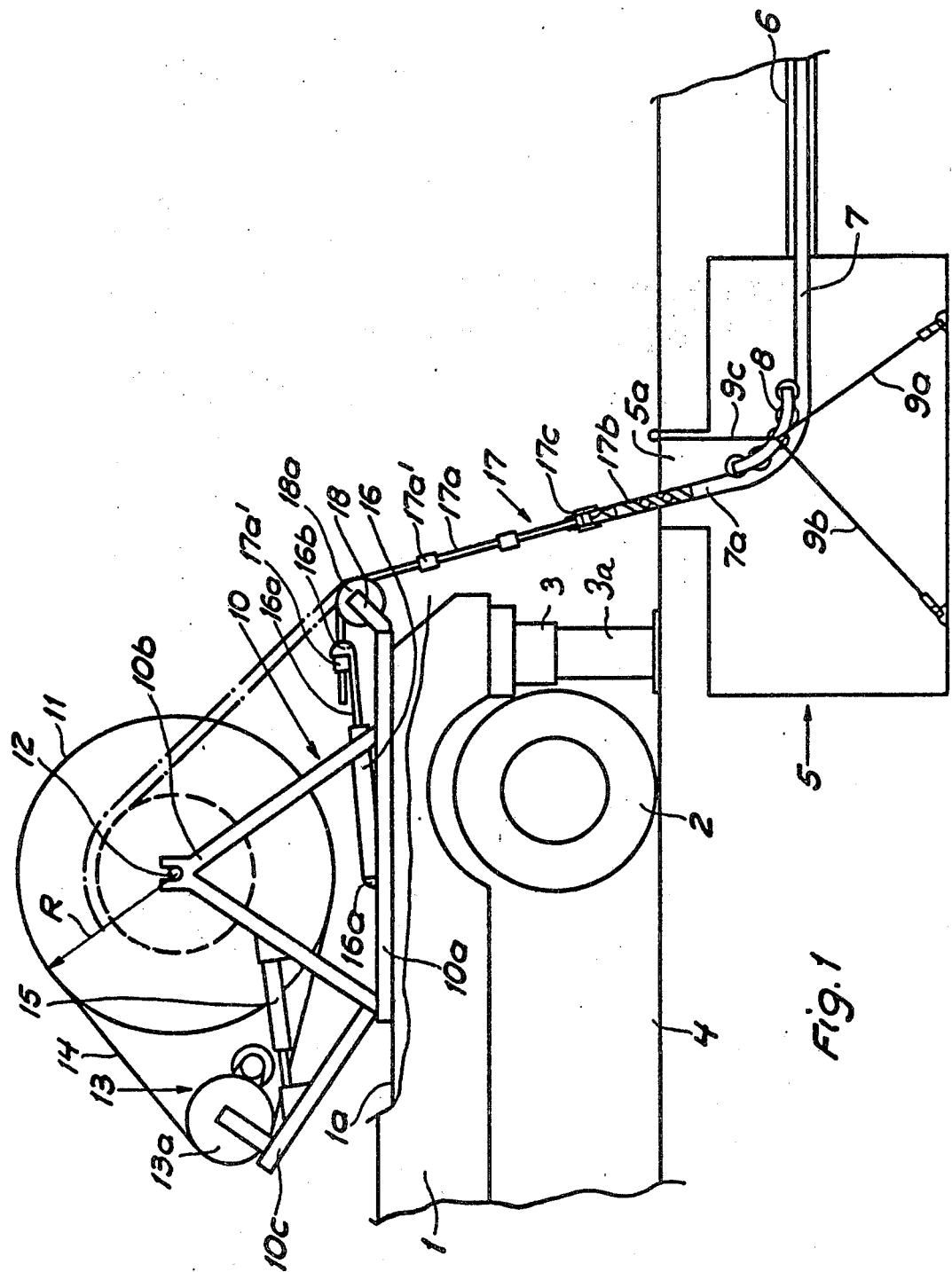
FIG. 1 is a side view in partial section of a vehicle positioned at a cable pit for a cable duct, with, set up on the vehicle, equipment for pulling free and winding up a cable installed in the duct.

FIG. 1 shows parts of a vehicle in the form of a truck, shown by a truck platform 1 and a rear wheel 2. The vehicle is relatively large and may take the form of a conventional truck in the 4–6 ton size range. The vehicle is fitted at the rear with hydraulic cylinders 3, whose pistons 3a can be applied to firm ground 4 so that when pistons 3a are activated, the rear parts of the vehicle are raised and the rear wheels 2 assume a position above ground level. Arranged in the ground there is a cable pit 5 of basically known type, in which one or more ducts 6 for one or more telephone cables 7 is/are arranged. The duct may be in the form of pipes made up, for example, of concrete blocks—not specially shown—with cavities passing through them, in which the affected cables 7 are laid. The concrete blocks are arranged one after the other in the longitudinal direction of the cable, and the concrete blocks may, owing to displacements in the ground, be offset relative to each other so that the cavities passing through the concrete blocks are not completely in line with each other. This means that the cable in question may be relatively firmly anchored in its duct. In addition, the concrete blocks may be more or less hollow, and two opposite sides of the blocks may have entry and exit apertures for the cable in question. Consequently in the block in question the cable passing through will sag to a greater or lesser extent owing to the distance between the entry and exit apertures, which further anchors the cable to the block in question.

A curved cable track 8 of basically known type has been arranged in the cable pit. The cable track, which includes pulleys on which the cable in question can run, is fixed in front of the cable duct by means of anchoring stays 9a, 9b and 9c, which are arranged so that the cable 7 can be led from its duct 6 out along the curved track and deflected up through the opening 5a of the cable pit without the cable being subjected to deflections which might damage it.

A frame 10 is set up on the platform of the vehicle. The frame has relatively large dimensions and is about 5 m long, about 1.7 m wide and about 1.5 m high overall. The frame has a base unit 10a, via which the frame is set up on the upper surface 1a of the platform 1, and is secured removably to the upper surface 1a in a previously basically known manner. In addition the frame has two bearing brackets 10b projecting upwards from each long side of the frame, for a cable drum 11 for the said cable 7. The cable drum 11 can rotate on the bearing brackets via its drum axle 12. In the case shown the drum has a radius of about 1.3 m. The drum can be driven by means of a motor unit 13, which is fixed to a subframe pivoted on frame 10. The motor unit drives the drum via a transmission component 14 which may be in the form of a basically known chain belt placed over one cheek of the drum and over a drive pulley 13a on motor unit 13. Since the drive unit is arranged on a subframe which can pivot relative to the rest of the frame, the transmission component can be suitably tensioned by adjusting the pivot angle of subframe 10c. This adjustment is performed by two hydraulic pistons 15 of basically known type. As a consequence of the arrangement shown, the frame can carry drums with different cheek diameters, to which the transmission component is adapted by selecting the pivot angle setting of the abovementioned subframe. The transmission component may consist of the component described in Swedish patent application No. 200881.

Also arranged on the frame is a pull-free mechanism 16, which in the embodiment example shown is in the form of a hydraulic cylinder. One end 16a of hydraulic cylinder 16 is attached to a cross-member not shown in detail in FIG. 1. Piston 16a of hydraulic cylinder 16 has a hook 16b at its free end. The pull free piston mentioned above can be coupled to the free end 7a of cable 7 via pulling device 17, which is made up of a draw line or draw wire 17a, a plastic and/or cloth tape 17b which can be wrapped around the relevant cable end 7a, and a coupling device 17c, by means of which the draw wire 17a and the tape 17b are connected. The draw wire 17a is fitted with a number of so-called clamping locks 17a', which are uniformly spaced along the draw wire. The hook 16b on the hydraulic piston 16a is arranged so that it interacts with the relevant clamping block 17a' on the draw wire 17a. Also secured to the frame at its rear end is a so-called spreader device 18 which includes among other things a pulley 18a via which on the one hand the draw wire 17a passes at the stage in which the cable 7 is pulled free, and on the other hand, via which the cable 7 passes during subsequent reeling-up of the cable on to the drum 11.

The procedure on pulling cable 7 from its duct 6 is as follows. The curved roller track 8 is installed in the cable pit so that the subsequently pulled-up cable can be guided via the opening of the cable pit without significant bending of the cable and in such a way that the cable does not touch the walls of the cable pit. The plastic and/or cloth tape 17b is wrapped around the cable end 7a and is coupled to the draw wire 17a via the coupling device 17c. The pulley 18a of the spreader device 18 is positioned laterally across the frame so that it is essentially in line with the hydraulic cyinder 16. Draw wire 17a is then placed over the pulley 18a and the outermost clamping lock 17a' of the draw wire 17a is placed in hook 16b on the piston. Hydraulic cylinder 16 is then operated so that tension is produced in draw wire 17a. The hydraulic cylinder, as well as other components of the equipment, must be of such a size that a reliable small lengthwise displacement movement can be obtained in the cable 7, and therefore provide a reliable pull-free function. The hydraulic cylinder is made by, for example Monsun-Tison, and has a tractive force of about 1–10 tons. In certain cases the cable may be pulled free by stages, in which case, when the piston has performed its stroke, and has pulled out or lengthened the cable by a corresponding amount, the next clamping lock can be hooked on after the piston has been returned to its extended position. By actuating the piston 16a again the cable can be pulled up further, and so on. It will be realized from the above that the number of clamping locks and the length of the draw wire 17a may vary depending on the position of the cable and the length of pull-free movement required.

After pulling free, the pulling devices are uncoupled and the end of the cable can then be connected with a further draw wire, not specially shown, by means of which the end of the cable is pulled up towards and anchored on the drum. In certain cases this additional draw wire may conceivably be omitted. The drum is then made to rotate by means of the motor unit, after it has first been ascertained that the transmission component 14 has been sufficiently tensioned by means of the hydraulic piston 15. The pulled-free cable 7 can then be wound or reeled up directly on to and by means of the drum and its associated motor unit 13a; both the motor unit and the drum must be appropriately sized. The motor unit is rated at about 3.0 kW.

Figure 2:
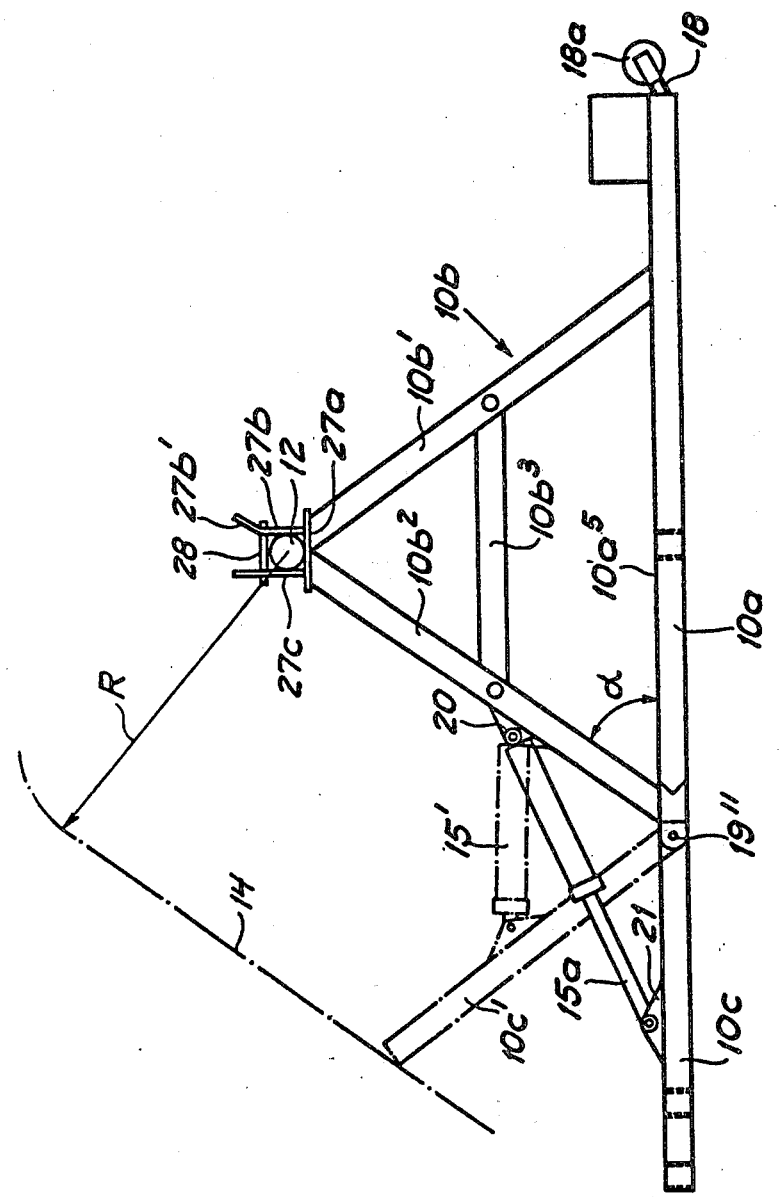
FIG. 2 is a side view in detail of a frame forming part of the equipment shown in FIG. 1
Figure 3:
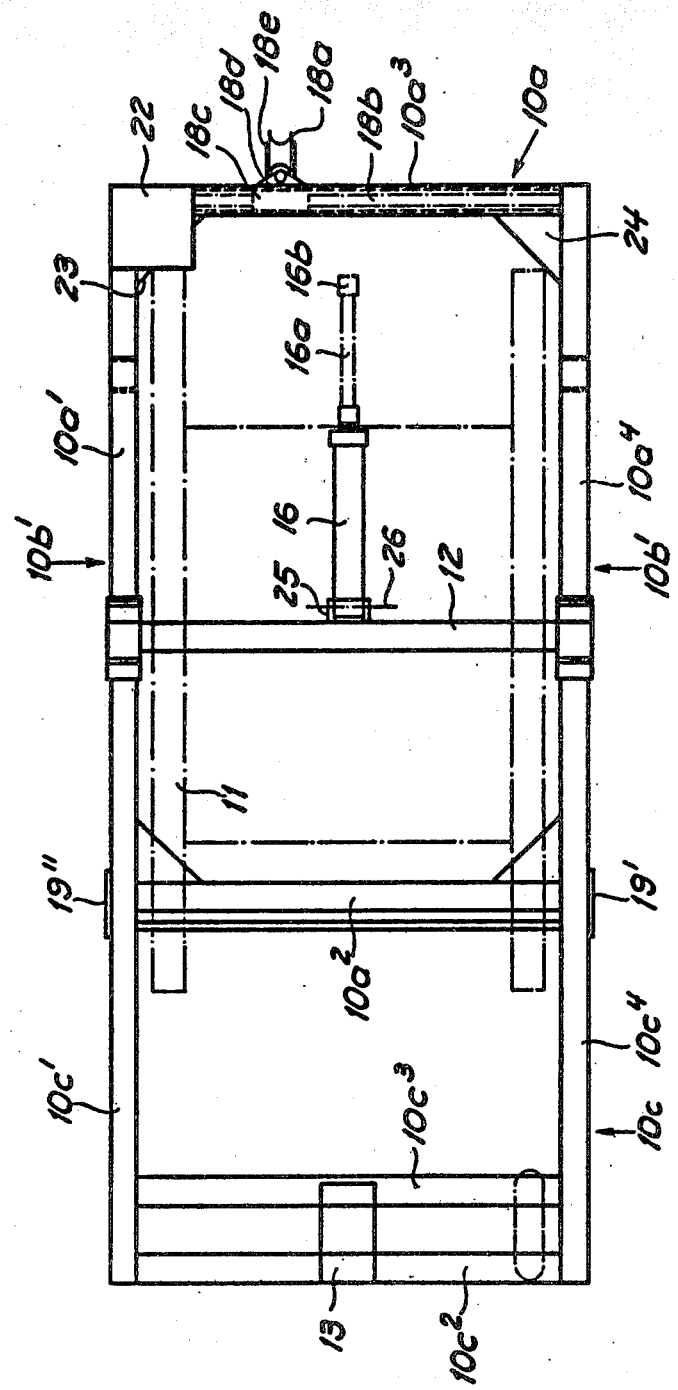
FIG. 3 is a plan view of the frame according to FIG. 2.

The design of the frame is shown in greater detail in FIGS. 2 and 3. The frame is constructed from beam members of steel or similar, and each beam member has a square cross-section with a side of about 100 mm. The base unit $10a$ is in the form of a four-sided frame which, in the embodiment example, is rectangular. In FIG. 3 the beam members of the four-sided frame are indicated by $10a^1$, $10a^2$, $10a^3$ and $10a^4$. A fifth beam member $10a^5$ runs between the longitudinal beam members $10a^1$ and $10a^4$ and parallel with the lateral beam members $10a^2$ and $10a^3$. The above-mentioned rectangular frame, which will be referred to hereafter as the first frame, carries on pivots at its first end the second frame, the beam members of which are designated $10c^1$, $10c^2$, $10c^3$ and $10c^4$. The second frame pivots on the first frame via the ends of beam members $10c^1$ and $10c^4$. Pivoting is achieved by means of pivot pins 19' and 19" in a basically known manner. The second frame also has a square cross-section in the illustrated embodiment, and beam members $10c^2$ and $10c^3$ are arranged parallel to each other and close together to provide a mounting for motor unit 13.

The bearing brackets $10b'$ and $10b''$ projecting upwards from the long sides of the first frame or the longitudinal beam members $10a^1$ and $10a^4$ each comprise two beam members $10b^1$ and $10b^2$ meeting from each long side. The beam members that meet are linked together at the middle by means of a beam member $10b^3$ which extends essentially parallel with and immediately above the longitudinal beam $10a^4$ and $10a^1$ of the first frame. In each bearing bracket the first beam member $10b^1$ of the above-mentioned beam members that meet extends from around the middle of the front half of the longitudinal beam member $10a^4$ or $10a^1$ of the first frame. The second beam member $10b^2$ of the above-mentioned beam members that meet extends from the angle between beam members $10a^4$, $10a^2$ or $10a^1$, $10a^2$ on the first frame. Each beam member $10b^1$ and $10b^2$ in each bearing bracket extend up from the relevant longitudinal beam member $10a^4$ or $10a^1$ at an angle which is about 35°. At the meeting point of beam members $10b^2$ and $10b^3$ of each bearing bracket there is arranged an attachment lug 20 for hydraulic cylinder 15. Attachment lug 20 is fixed to bearing bracket beam member $10b^2$. The two bearing brackets may each be fitted with an attachment lug 20 as an alternative to only one of the bearing brackets having such an attachment lug 20. In this way the frame can be fitted with one hydraulic cylinder 15 or two hydraulic cylinders 15.

The second frame also has an attachment lug 21 for the relevant hydraulic cylinder 15. The said attachment lug 21 is positioned on beam member $10c^4$ or $10c^1$, on the upper face of the beam member in question. In addition, the attachment lug is positioned approximately at the middle of the beam member in question. Piston 15a of the hydraulic cylinder 15 is attached to attachment lug 21. Depending on the amount of extension of the hydraulic cylinder, the second subframe is held at different angles relative to the first subframe. When the piston 15a is fully extended, the second subframe assumes a position in which it is a straight continuation of the first frame. In FIG. 2 this position is indicated by solid lines and reference 10c. In the fully retracted position of the piston, which is indicated in FIG. 2 by chain-dotted lines 15', the second subframe is held at its greatest angle relative to the first subframe. Because of the adjustability of the second subframe described above, it is possible to adapt the tensioning of transmission component 14 to different drum diameters.

At its other end, facing away from the second subframe, the main frame carries the above-mentioned spreader device 18 and its associated rotating pulley 18a. As shown in FIG. 3, the spreader device is arranged so that it can be displaced in the lateral direction of the main frame along beam member $10a^3$. This beam member has been provided with an internal rack 18b driven by a hydraulic motor 22 situated at the angle between beam members $10a^1$ and $10a^3$. Arranged on the rack there is a nut 18c which is displaced longitudinally along the rack as a function of the driving of the rack by motor 22. Connected to the nut there is a fixing 18d for bearing brackets 18e of the pulley 18a.

At the corners between beam members $10a^1$, $10a^3$ and $10a^4$, $10a^3$ the main frame is fitted with triangular reinforcements 23 and 24. Additional beam member $10a^5$ of the main frame, which runs parallel to beam members $10a^2$ and $10a^3$, and which is attached at its ends to longitudinal beam members $10a^1$ and $10a^4$, is positioned essentially immediately below the drum axle 12, viewed from above. The beam member $10a^5$ carries a fixing 25 for the hydraulic cylinder 16, which serves as the pull-free mechanism as described above. The fixing 25 comprises in principle a pair of bearing brackets in which the first end of the hydrualic cylinder pivots on a pivot pin as indicated by 26 in FIG. 3. The pivot pin 20 is fixed in a conventional manner to the bearing brackets of the fixing. The fixing 25 is located in the central part of the fifth beam member.

Bearing devices for each end of the drum shaft are arranged in each bearing bracket at meeting beam members $10b^1$ and $10b^2$. The bearing devices comprise a lower horizontal plate 27a which also serves to hold the meeting beam members together. Arranged perpendicular to plate 27a there are two further plates between which the drum axle end in question can be placed. The first plate 27b of the latter plates is designed with an angled part 27b' which is arranged so that it is angled away from the second plate 27c of the latter plates. This angling facilitates insertion of the drum axle between plates 27b and 27c. At the plates 27a, 27b and 27c it is also possible to fit a split pin 28 which is carried by the two opposite plates 27b and 27c. The split pin prevents the drum axle end disengaging from the bearing devices. With the bearing devices the main frame has an overall height of about 1.5 m. With the dimensions chosen in the embodiment example the main frame can carry a drum with a maximum diameter of about 1.3 m. In FIG. 3 the drum is indicated by the chain-dotted lines 11. The maximum axle diameter is bout 140 mm.

Figure 4:
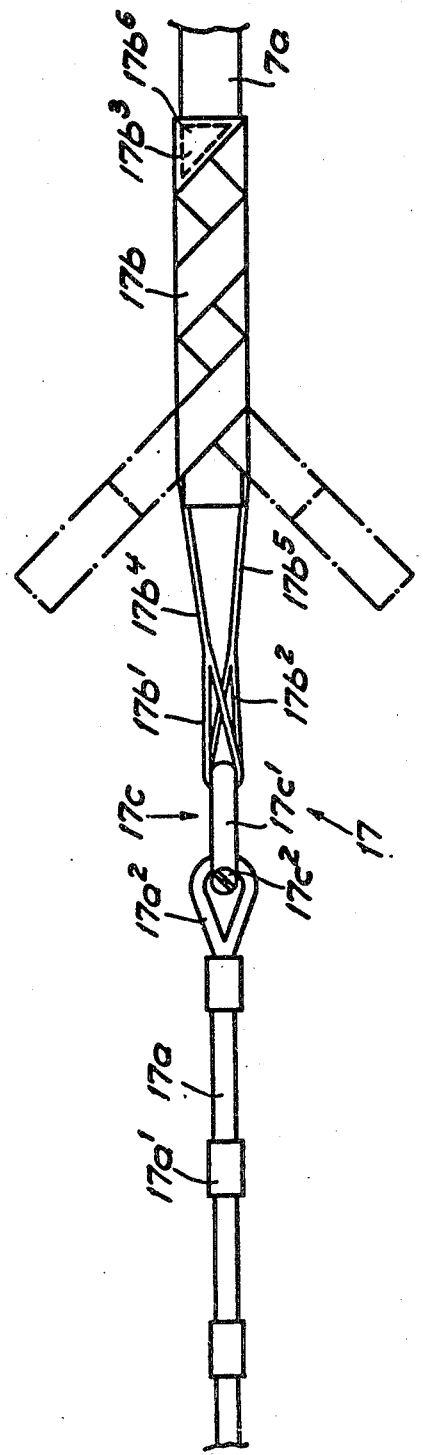
FIG. 4 is a detailed view of the pulling device that forms part of the equipment shown in FIG. 1.

FIG. 4 is intended to show the various components of the above-mentioned pulling device 17. At the end in question, draw wire 17a has an eye $17a^2$. The plastic and/or cloth tape 17b also has eyes $17b^1$ and $17b^2$ at its free ends. Draw wire 17a and tape 17b are connected by means of a shackle, the yoke of which is indicated by $17c^1$ and the screw by $17c^2$. The yoke $17c^1$ passes through eyes $17b^1$ and $17b^2$ of the plastic and/or cloth tape; the screw passes through the eye $17a^2$ of the draw wire 17a.

The plastic and/or cloth tape may be in the form of, for example, Terylene (polyester). The plastic material may have a specific gravity of, for example, 1.38 and a melting point of about 260° C. The tensile strength is about 8.5 g/den, the elongation at rupture is about 10–11% and the modulus of elasticity 120–130 g/den. The tape is about 50 mm wide and about 1–3 mm thick. The total length of the tape is about 2.5 m and about half way along it has a fold $17b^3$ from which two essentially equally long tape sections $17b^4$ and $17b^5$ extend. The fole $17b^3$ is made in such a way that the tape sections leave the fold essentially at right angles to each other, and the tape is sewn to retain the fold. The stitching is indicated by $17b^6$. To apply the tape the fold is placed, for example, behind the cable as seen by the person applying the tape, after which the two sections of the tape are laid around the cable with the broad surface against the cable sheath and in such a way that the tape sections cross each other.

In the wrapped-on position of the tape on the cable, the first tape section makes contact with the outside of the cable or similar via its first side, which coincides with the first side of the tape. The second tape section makes contact with the outside of the cable or similar via its second side, which coincides with the second side of the tape. In addition, the two tape sections will, counting from the fold, each extend along an essentially spiral track along the outside of the cable or similar at the same time as they cross each other. The ends of the tape sections are brought together and connected to the draw wire $17a$ via coupling devices $17c^1$ and $17c^2$ as descrbed above. FIG. 4 shows with chain-dotted lines the ends of tape $17b$ that carry eyes $17b^1$ and $17b^2$, shown in their respective directions of wrapping before being brought together for attachment to the coupling devices $17c$. By applying the plastic and/or cloth tape in the manner shown, an effective tightening function is obtained around the cable, and this tightening function increases with the tractive force in the tape $17b$. The proposed design of the tape also provides a functional pulling function in the cable, which will not be subjected to damage during pulling. The tape can be wrapped on to the cable anywhere along the length of the cable, and thus not only at the cable end.

The invention is not limited to the form of embodiment shown in the above as an example, and may undergo modifications within the scope of the claims and invention concept below. Thus, for example, pulling up towards the drum after pulling free can be performed by means of the drum and motor unit.

It is obvious that the pulling device 17 and the pull-free mechanism 16 may be used even when the cable has been pulled out and been connected to the drum 11. A roller having a groove intended to cooperate with the cable may be connected to the free end portion $16b$ and the cooperation may occur during the reeling up sequence in order to pull the cable free.

INDUSTRIAL APPLICATION

The equipment proposed in conjunction with the invention consists of few and simple parts which are easy to manufacture and assemble in a factory. The main frame can be set up and anchored on a suitable vehicle. In principle the main frame can also be integrated with the vehicle in question.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. Method for extracting, reeling up, or pulling-in of a heavy cable or other long flexible object utilising a main frame adapted to be set up on a vehicle, the main frame including a base unit made up of a number of beams and two bearing brackets projecting upwards from long sides of the base unit, a drum freely rotatably arranged on the bearing brackets on the main frame, driving means for the drum including a motor unit and a transmission component for operatively connecting the motor unit to drive the drum, comprising the steps of connecting a pulling device both to a core of the cable and to a pull-free mechanism fixed to the main frame, activating the pull-free mechanism to effect a small longitudinal displacement of the cable and to cause the cable to be pulled free from a cable duct, disconnecting the pulling device after the cable has been pulled free, pulling the core up towards and anchoring the core on the drum, activating the motor unit to turn the drum to accomplish the subsequent main part of the longitudinal displacement of the cable by direct winding onto the drum.

2. Method according to claim 1, wherein the cable is laid in the cable duct arranged in the ground, said duct being connected to a cable pit having an opening, further comprising the steps of disposing the vehicle adjacent to the cable pit, connecting the pulling device to the core via the opening of the cable pit, installing a curved cable track in the cable pit, and guiding the cable via the track during the direct winding onto the drum.

3. Method according to claim 1 or 2, further comprising guiding the cable during the direct winding with a guiding device which distributes the cable evenly on the drum.

4. Method according to claim 1, further comprising wrapping a soft and relatively wide tape about the end of the core for connecting the pulling device to the core of the cable such that upon effecting the small longitudinal displacement the tape is tightened around the core and pulls the core along with the tape.

5. Arrangement for extracting, reeling up or pulling in a heavy cable or other long flexible object, comprising a main frame adapted to be set up on a vehicle, the main frame having a base unit made up of a number of beams and including two bearing brackets projecting upwards from long sides of the frame, a drum for said cable being freely rotatably supported on the bearing brackets, driving means for the drum, the driving means comprising a motor unit and a transmission component for operatively connecting the motor unit to drive the drum, a pull-free device fixed to the main frame and connected to a core of the cable by a pulling device, the pull-free device transferring a small longitudinal displacement motion to the cable to pull the cable free from a cable duct, the main frame, motor unit and drum being arranged such that after the cable has been pulled free, the core is anchored to the drum to wind the cable directly onto the drum during the major part of the longitudinal displacement of the cable by actuation of the motor unit.

6. Arrangement according to claim 5, wherein the base unit of the main frame includes a first subframe with longitudinal and lateral beams, the pull-free mechanism including at least one hydraulic cylinder which is attached to one of the lateral beams of the main frame.

7. Arrangement according to claim 6, further comprising a second subframe pivoted on the first subframe, said second subframe carrying said motor unit, the second subframe being adjustable to different angular positions relative to the first subframe by at least one other hydraulic cylinder such that the degree of tensioning of the transmission component can be adjusted.

8. Arrangement according to claim 5, further comprising a spreader device arranged on the main frame for guiding the cable, said spreader device uniformly distributing the cable on the drum during winding.

9. Arrangement according to claim 7, wherein each bearing bracket comprises two beam members extending up from the longitudinal beams of the first subframe and meeting at an angle, said beam members carrying at their upper ends bearing devices for an axle of the drum, central portions of the beam members being connected together by further beam members, a first beam member of the said meeting beam members having a bearing attachment for the other hydraulic cylinder.

10. Arrangement according to claim 5, wherein the pull-free device includes a hook arranged to interact with a plurality of clamping locks which are uniformly distributed along a draw wire forming part of the pull-free device.

11. Arrangement according to claim 7, wherein the first and second subframes in the base unit have a total length of about 5.0 m and a width of about 1.7 m and the bearing brackets have a height of 1.5 m above the first subframe.

* * * * *